United States Patent [19]

Fischer

[11] Patent Number: 4,700,954
[45] Date of Patent: Oct. 20, 1987

[54] RADIALLY EXTENSIBLE JOINT PACKING WITH FIBER FILLED ELASTOMERIC CORE

[75] Inventor: Richard J. Fischer, Aurora, Colo.

[73] Assignee: The Gates Rubber Company, Denver, Colo.

[21] Appl. No.: 436,242

[22] Filed: Oct. 25, 1982

[51] Int. Cl.⁴ .................... F16J 15/10; F16J 15/56
[52] U.S. Cl. ................................ 277/165; 277/30; 277/227; 277/DIG. 6
[58] Field of Search ............... 277/125, 30, 31, 165, 277/227–230, DIG. 6

[56] References Cited

U.S. PATENT DOCUMENTS

| | | | |
|---|---|---|---|
| 3,049,385 | 8/1962 | Smith | 277/227 |
| 3,464,709 | 9/1969 | Furgason et al. | 277/124 |
| 3,671,048 | 6/1972 | Jyory et al. | 277/227 |
| 3,879,044 | 4/1975 | Estes | 277/DIG. 6 |
| 4,496,161 | 1/1985 | Fischer | 277/30 X |

Primary Examiner—Robert S. Ward, Jr.
Attorney, Agent, or Firm—H. W. Oberg, Jr.; C. H. Castleman, Jr.

[57] ABSTRACT

An annularly shaped elastomeric core type joint packing having a fiber reinforcement, having a radial reinforcing effect with respect to a longitudinal axis of the core.

7 Claims, 8 Drawing Figures

RADIALLY EXTENSIBLE JOINT PACKING WITH FIBER FILLED ELASTOMERIC CORE

BACKGROUND OF THE INVENTION

The invention relates to joint packings, but more particularly, the invention relates to a packing with an elastomeric core that is radially extensible when externally clamped. Annularly shaped elastomeric core type packers are used extensively by the petroleum industry in a variety of tools that selectively seal various portions of an oil well casing. While separate tools may be required to perform various oil well operations, several of the tools use the same or similar type of sealing means in the form of an annularly shaped elastomeric core. The core is radially extensible when externally clamped along the longitudinal axis of the core. When clamped, circumferential portions of the core contact and press against an internal wall of a well casing to effect a seal. Differential pressure is customarily applied across the effected seal where pressure at the "up-hole" side of the joint packing in the well casing is higher than the pressures at the "down-hole" side of the packing. Of course, the direction of the pressure differential may be reversed in some applications. The differential pressure causes the packing to deform and distend along its longitudinal axis in the direction of the lower pressure. Present day packers have a high compression modulus (e.g., from about 525 psi to about 725 psi at 25 percent compression at 300° F. on a first compression cycle) to resist such deformation while maintaining an effective seal. Some joint packings are made with two elastomeric stocks of different moduli where a softer elastomeric stock is located along a center portion of the joint packing for radial extensibility. Combinations of time, temperature, differential pressure, and compressive force affect the useful life of such packings as measured by their ability to maintain an effective seal when radially extended. Of these, temperature and differential pressure are, perhaps, most detrimental to an elastomeric core type joint packing. For example, a core type packing having approximately 4.5 in diameter, 3 in length, and approximately a 1 in thickness may maintain an effective seal at differential pressures from about 3500 psi to 4500 psi at 300° F. The same type packing will only handle a differential pressure from about 1000 psi to about 2000 psi at a temperature of 500° F. while maintaining an effective seal. Such packings will not seal a differential pressure from about 5000 psi to about 5500 psi at temperatures as low as 200° F. A typical failure mode of such packings is a rupturing of the elastomer at the distended circumferential portion on a low pressure side with an associated loss of radial extension (and hence, effective sealing). Some petroleum well environments require sealing a casing at temperatures above 300° F. and differential pressures greater than 4500 psi.

SUMMARY OF THE INVENTION

In accordance with the invention, an annularly shaped elastomeric core type joint packing is provided that is radially extensible when externally clamped along a longitudinal axis. The packing is capable of maintaining an effective seal at temperatures above 300° F. and pressures above 4500 psi. Improved performance is achieved by an elastomeric core having an embedded reinforcement of dispersed fiber. Some of the fiber is oriented lengthwise to have reinforcing components along radial lines with respect to a longitudinal axis of the packer. Together, the elastomeric core and fiber reinforcement exhibited a compression modulus of about 1700 psi at 25 percent compression at 300° F. on a first compression cycle.

Other features of the invention will be apparent after reviewing the figures and description thereof wherein.

DESCRIPTION OF PREFERRED EMBODIMENT

Figure 1:
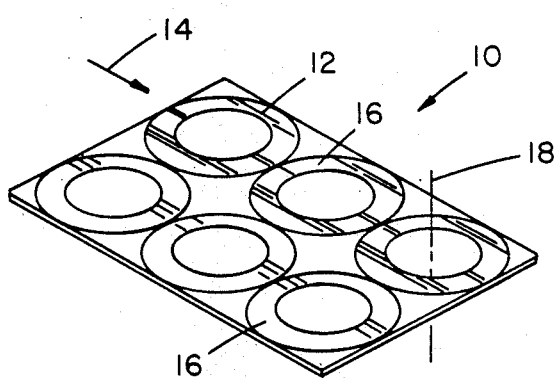
FIG. 1 is an isometric view of a sheet of elastomeric stock containing embedded fibers showing cutting lines for annular discs.

Referring to FIGS. 1–6 a method for making an elastomeric core joint packing of the invention is illustrated. In FIG. 1, a sheet 10 of elastomeric stock containing an embedded fiber 12 is calendered in known fashion. The elastomer may be of any chosen type such as the natural rubbers, synthetic rubbers, or blends thereof. However, in petroleum type oil and gas well applications, the stock should be resistant to a petroleum environment. Examples of suitable elastomers include the nitrile rubbers and ethylene propylene diene monomer (EPDM). Any fiber such as nylon, cellulose, aramid, and fiber glass may be used. However, it is preferred that the fibers be resistant to degradation from heat. Preferred fibers include fiber glass and aramid having lengths from about 1 mm to about 12 mm.

As known, embedded fiber orients itself generally lengthwise in the direction of elastomer flow. Calendering an elastomer which contains an embedded fiber, orients the fiber 12 longitudinally 14 with the calendered sheet 10 as illustrated. Annular discs 16 may then be cut from the sheet in "cookie cutter" fashion.

Figure 2:
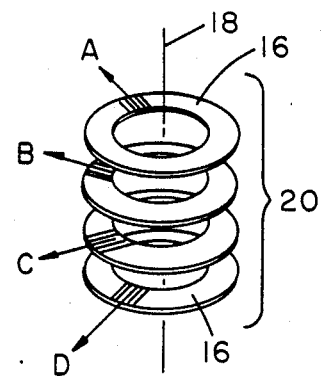
FIG. 2 is an exploded isometric view showing how annular discs are stacked into plies with discs angularly rotated relative to each other about their longitudinal axis.

As illustrated by FIG. 2, a plurality of annularly shaped discs 16 are successively stacked atop each other and aligned along their longitudinal axes 18. The discs are angularly rotated relative to each other about their axes when stacked forming a plied core 20 where the fiber of the stacked discs are oriented in different directions A, B, C, D.

Figure 3:
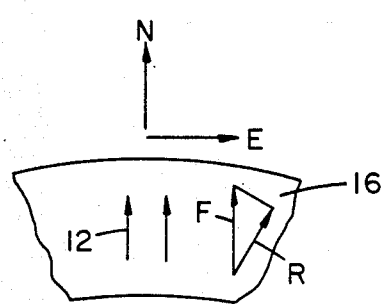
FIG. 3 is an exploded plan view of a portion of an annular disc showing fiber orientation and how fibers have a radial reinforcing component.

In plied form, each disc has some fiber oriented lengthwise along a radius with respect to the longitudinal axis of the core. Although there will only be a few fibers within each disc that are perfectly radially aligned, the non-radially aligned fiber will exhibit a radial reinforcing component. Referring to FIG. 3, assuming that fiber is oriented in a north direction N and has a reinforcement force F, there will be a component R of the reinforcement force that is radial in direction.

Figure 4:
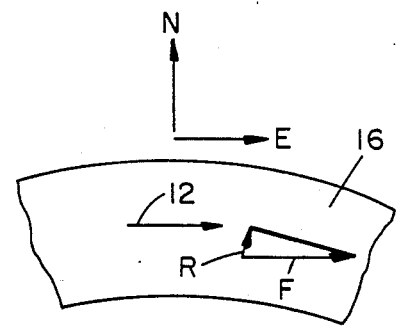
FIG. 4 is a view similar to FIG. 3 but showing fiber oriented in a different direction.

FIG. 4 shows how fiber may provide no reinforcement in the north direction N and a full reinforcment force F in the east direction E. Again, there is a component R of the reinforcement force that is radially oriented in relation to the disc. Thus, the stacked plies have fiber which has radial reinforcement components. It is estimated that approximately fifty percent of the fiber is effective in radially reinforcing the elastomeric core.

A so-plied core 20 is placed in a mold and cured in known fashion. Care should be taken to minimize elastomer flow during the molding process as the effect of elastomer flow is reorientation of fiber in the direction of the elastomer flow. Of course, some fiber reorientation cannot be eliminated. However, compression molding minimizes the degree of fiber reorientation during the molding process.

Figure 5:
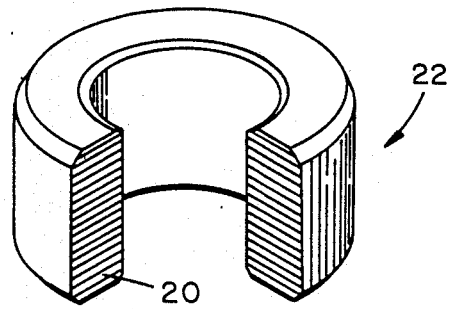
FIG. 5 is an isometric view of an elastomeric core joint packing of the invention with a portion cutaway to show orientation of stacked plies.
Figure 6:
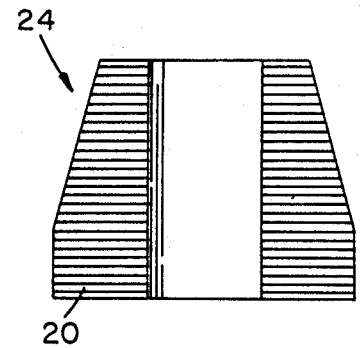
FIG. 6 is an axial cross sectional view of an elastomeric core type packer having frustoconical exterior surface.

FIGS. 5 and 6 illustrate cured elastomeric core type packings 22, 24 containing embedded fiber. The plied effect of the stacked discs to form a core 20 is illustrated. However, such plies are not readily individually discernible in the finished product because of the molding process. However, microscopic analysis shows generally radial orientation of the fiber.

Figure 7:
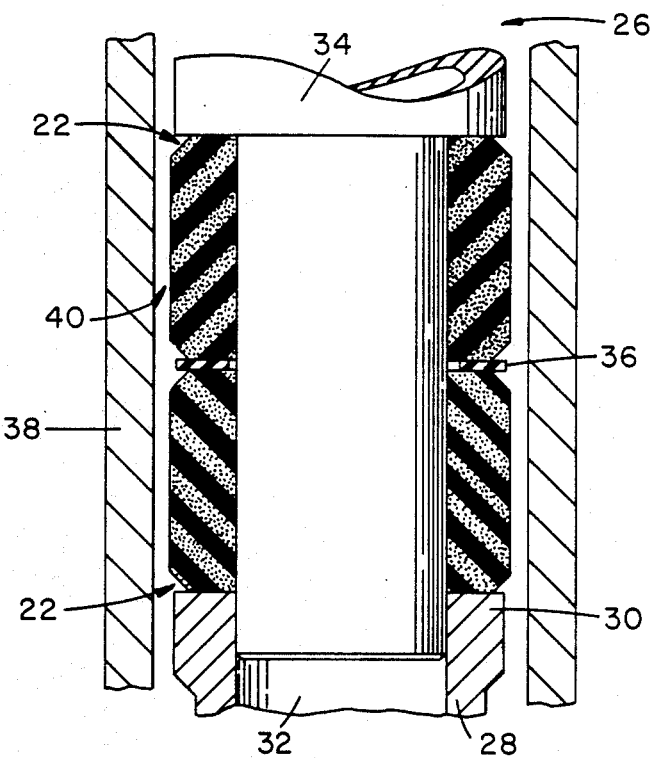
FIG. 7 is a partial diametrical cross-sectional view showing the use of two elastomeric core joint packings of the invention as part of a tool positioned in a casing.

In use, one or more of the annularly shaped elastomeric core type joint packings 22 of the invention are assembled as part of a clamping tool 26 as shown in FIG. 7. A "down-hole" portion 28 of the tool may have an annular flange 30 that abuts an end portion of one packing and an internal bore 32 which receives a collared piston 34 that engages an end portion of a second packing. A washer 36 may be disposed between the stacked packings. The tool 26 is placed in a casing 38 where there is clearance 40 between the sides of the core and the casing.

Figure 8:
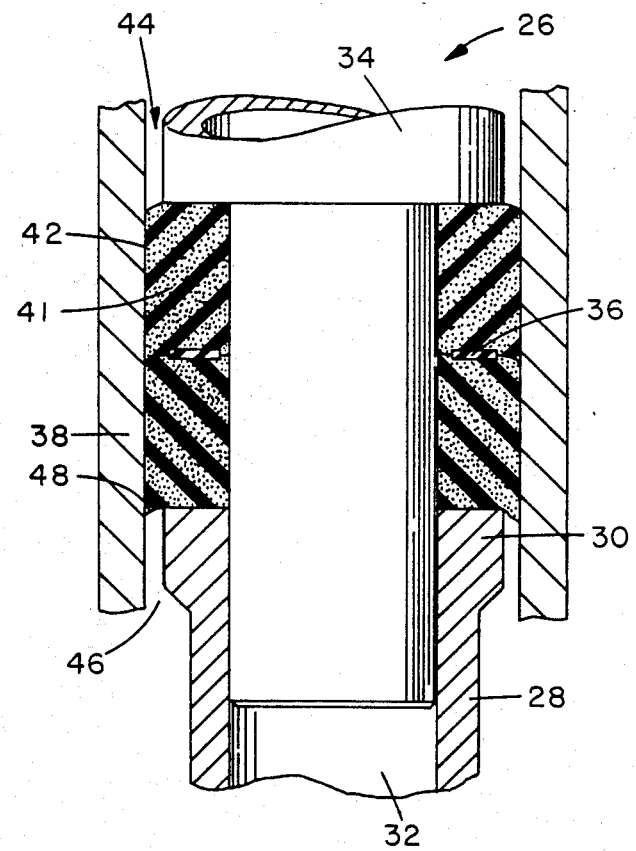
FIG. 8 is a view similar to FIG. 7 but showing the tool externally clamping the elastomeric core causing it to radially extend and seal against the casing as differential pressure is applied across the core.

As shown in FIG. 8, when the tool 26 is activated, there is relative axial movement between the tool components 28, 34 and corresponding axial clamping of the packings causing them to radially extend 41 to engage and seal 42 against the well casing 38. Differential pressure may then be applied above 44 and below 46 the effected seal which causes circumferential portions of the packing to distend 48. The largest and most sensitive distension 48 where a failure may occur is located along the annular low pressure side 46 of the effected seal. Fiber orientation with a reinforcing component along radial lines of the elastomeric core packing inhibits distension from differential pressures and improves the operating characteristics thereof. For example, a core of the configuration shown in FIG. 5 having a 4.45 inch outside diameter, a 2.75 inch inside diameter, a 2.86 inch axial length with an embedded glass fiber constituting at least about 10 percent by volume, and, more preferably at least about 11 percent by volume, repeatedly effected a satisfactory seal in a well-type casing having a 4.95 in. internal diameter, at pressures up to about 5000 psi with some seals exhibiting as high as 6000 psi at temperatures of 300° F. at 25 percent compression at 300° F. This is approximately a 25 percent improvement in sealing pressure over known seals of the prior art. The so-constructed packings had compression modulus of about 1700 psi at 25 percent compresson at 300° F. during their first compression cycle.

The foregoing detailed description is made for purpose of illustration only and is not intended to limit the scope of the invention which is to be determined from the following claims.

What is claimed is:

1. In a joint packing of the type with a generally annularly shaped elastomeric core that is radially extensible to effect sealing when externally clamped along a longitudinal axis of the core, the improvement in the core comprising:

an embedded reinforcement of at least about 10 percent by volume of fiber having lengths from about 1 mm to about 12 mm and dispersed in the elastomeric core where some of the fiber is oriented lengthwise to have a reinforcing component along radial lines with respect to the longitudinal axis of the core.

2. The joint packing as claimed in claim 1 wherein the core has a compression modulus of at least about 1700 psi at 25 percent compression at about 300° F. during a first compression cycle.

3. The joint packing as claimed in claim 1 wherein the fiber is fiber glass.

4. The joint packing as claimed in claim 1 wherein the core comprises a plurality of annularly shaped elastomeric discs having a longitudinal axis, the discs successively axially stacked atop one another along the longitudinal axis of the core wherein the discs have embedded fiber that is oriented substantially lengthwise in substantially the same direction across the discs and wherein stacked plies of discs are angularly rotated relative to each other about their axes so that fiber of the stacked plies are oriented in different directions.

5. The joint packing as claimed in claim 1 wherein the elastomeric core is of ethylene-propylene-diene-monomer.

6. The joint packing as claimed in claim 1 wherein the elastomeric core has a substantially cylindrical exterior surface portion.

7. The joint packing as claimed in claim 1 wherein the elastomeric core has a substantially frustoconical exterior surface portion.

* * * * *